(12) United States Patent  (10) Patent No.: US 9,272,820 B2
Cowie  (45) Date of Patent: Mar. 1, 2016

(54) CONTAINER WITH DETENT MECHANISM

(75) Inventor: Charles Henry Cowie, Jonesboro, AR (US)

(73) Assignee: Apex Brands, Inc., Sparks, MD (US)

( * ) Notice: Subject to any disclaimer, the term of this patent is extended or adjusted under 35 U.S.C. 154(b) by 929 days.

(21) Appl. No.: 12/917,391

(22) Filed: Nov. 1, 2010

(65) Prior Publication Data
US 2012/0104013 A1  May 3, 2012

(51) Int. Cl.
B65D 43/24 (2006.01)
B25H 3/02 (2006.01)
B60R 9/06 (2006.01)
B65D 43/16 (2006.01)
B60R 11/06 (2006.01)

(52) U.S. Cl.
CPC  *B65D 43/24* (2013.01); *B25H 3/02* (2013.01); *B60R 9/065* (2013.01); *B60R 11/06* (2013.01); Y10T 29/49826 (2015.01)

(58) Field of Classification Search
CPC .......... B65D 43/24; B25H 3/02; B60R 9/065; B60R 11/06; Y10T 29/29826
USPC ............ 220/831, 832, 843, 844, 840; 16/319, 16/334, 377
See application file for complete search history.

(56) References Cited

U.S. PATENT DOCUMENTS

| 636,950 | A | * | 11/1899 | Butcher | 206/45.28 |
| 3,065,308 | A | * | 11/1962 | Suyeoka | 206/425 |
| 3,272,379 | A | * | 9/1966 | Driza et al. | 220/832 |
| 3,786,693 | A |  | 1/1974 | Keipert |  |
| 4,029,234 | A | * | 6/1977 | Johnson et al. | 220/840 |
| 4,397,389 | A |  | 8/1983 | Findeisen |  |
| 4,421,215 | A |  | 12/1983 | Bellah et al. |  |
| 4,501,378 | A |  | 2/1985 | Berfield |  |
| 4,706,813 | A |  | 11/1987 | Schneider et al. |  |
| 5,100,015 | A |  | 3/1992 | Vanderstuyf |  |
| 5,235,830 | A |  | 8/1993 | Benge |  |
| 5,369,842 | A | * | 12/1994 | Beatty | 16/317 |
| 5,601,206 | A | * | 2/1997 | Haas et al. | 220/527 |
| 5,791,174 | A |  | 8/1998 | Fitzgerald et al. |  |
| 5,967,392 | A | * | 10/1999 | Niemi et al. | 224/404 |
| 6,036,050 | A | * | 3/2000 | Ruane | 220/831 |
| 6,494,064 | B1 |  | 12/2002 | Pena |  |
| 6,705,306 | B1 |  | 3/2004 | Dickey |  |
| 6,772,613 | B2 |  | 8/2004 | Webb et al. |  |
| 6,851,288 | B2 |  | 2/2005 | Howes |  |

(Continued)

OTHER PUBLICATIONS

Office Action dated Apr. 11, 2013 for pending Canadian Patent Application No. 2,756,365.

(Continued)

*Primary Examiner* — Mickey Yu
*Assistant Examiner* — Niki Eloshway
(74) *Attorney, Agent, or Firm* — Nelson Mullins Riley & Scarborough, LLP

(57) ABSTRACT

A container with a detent mechanism is disclosed. In one embodiment, a container comprises a housing comprising a side wall, a lid comprising a top surface and a lip depending from the top surface, and a detent mechanism disposed between the lip and the side wall. The lid is pivotably coupled with the housing and is configured to rotate between a first position covering an open end of the housing, a second position substantially exposing the open end, and an intermediate position between the first and second positions. The detent mechanism is configured to arrest the rotation of the lid at each of the positions.

13 Claims, 14 Drawing Sheets

(56) References Cited

U.S. PATENT DOCUMENTS

| | | | |
|---|---|---|---|
| 6,913,143 B2* | 7/2005 | Yang | 206/371 |
| 7,090,094 B2 | 8/2006 | Wade et al. | |
| 7,284,673 B2 | 10/2007 | Habeger et al. | |
| 7,416,228 B2 | 8/2008 | Pfitzinger et al. | |
| 7,418,846 B2 | 9/2008 | James et al. | |
| 7,493,675 B2* | 2/2009 | Lin et al. | 16/330 |
| 7,494,418 B2 | 2/2009 | Rifkin et al. | |
| 7,740,147 B1 | 6/2010 | Gilbert | |
| 7,870,972 B2* | 1/2011 | Elefante | 220/811 |
| 8,307,507 B2* | 11/2012 | Wang et al. | 16/334 |
| 8,510,913 B2* | 8/2013 | Kim | 16/334 |
| 2001/0032848 A1 | 10/2001 | Jones et al. | |
| 2006/0032860 A1* | 2/2006 | Hase | 220/831 |
| 2007/0034637 A1* | 2/2007 | Carmichael | 220/835 |
| 2008/0184598 A1 | 8/2008 | Handel et al. | |
| 2010/0000047 A1* | 1/2010 | Chang | 16/334 |
| 2010/0050712 A1 | 3/2010 | Tong et al. | |

OTHER PUBLICATIONS

Response to Office Action dated Apr. 11, 2013 for corresponding Canadian Patent Application No. 2,756,365.

Second Office Action dated Apr. 17, 2014 for corresponding Canadian Patent Application No. 2,756,365.

* cited by examiner

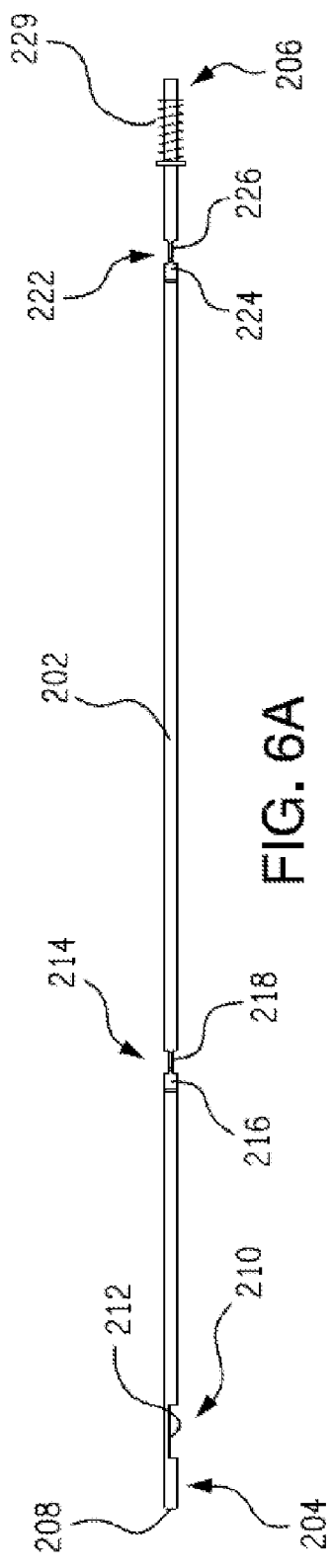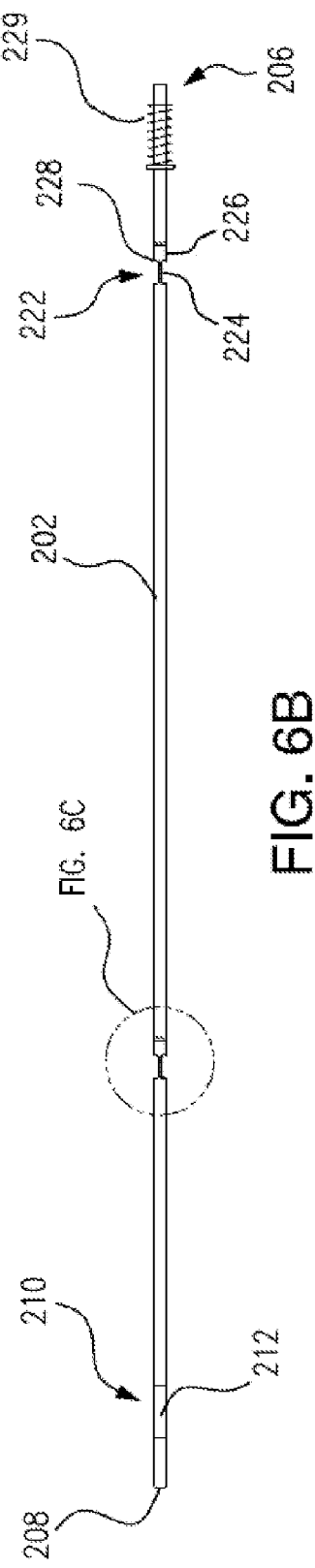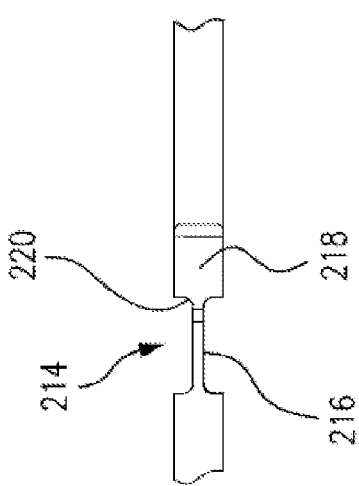

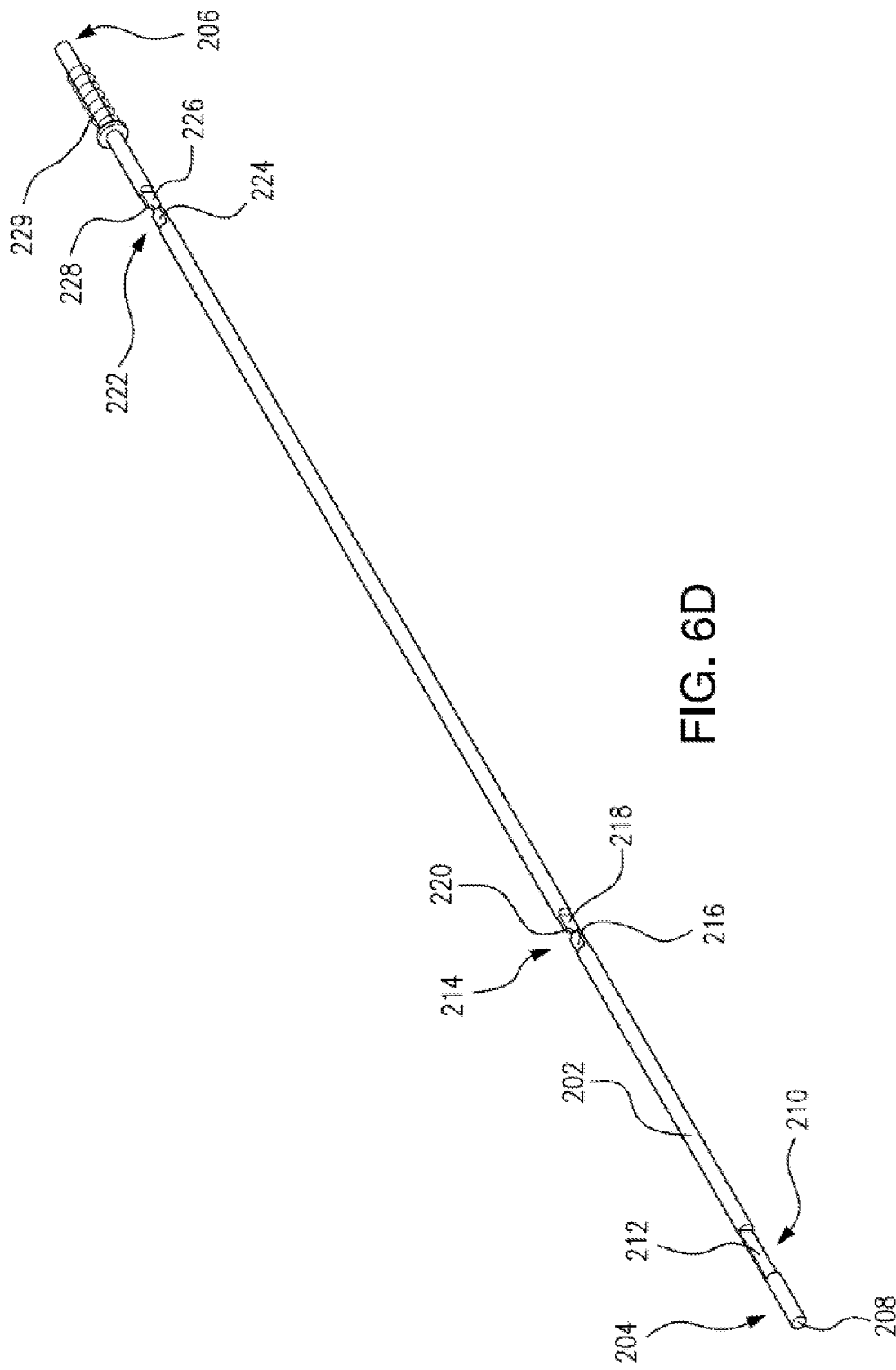

CONTAINER WITH DETENT MECHANISM

RELATED APPLICATIONS

The present application is related to commonly-assigned U.S. patent application Ser. No. 12/917,407, filed Nov. 1, 2010, entitled "Container with Locking Mechanism," incorporated by reference herein in its entirety for all purposes.

FIELD OF THE INVENTION

The present invention relates generally to storage containers. More specifically, the present invention relates to a storage container with a detent mechanism to provide incremental rotation of the container lid.

BACKGROUND OF THE INVENTION

Storage containers, including boxes and cabinets, are often used in the construction industry to store tools, fasteners, and the like. Such containers are typically formed from one or more sections of aluminum or sheet steel. Typically, a storage container comprises a receptacle and a lid that is attached via a hinge to the rear wall of the receptacle. Exemplary storage containers include those sold under the name JOBOX™ by Delta Consolidated Industries, Inc. of Jonesboro, Ark.

FIG. 1 is a perspective view of a prior art container 10 in an open position. As shown, container 10 is a truck box, a type of storage container which is typically mounted in the bed of a truck, such as a pickup truck. Truck boxes are ordinarily mounted directly behind the cab of the truck and span the distance between the side walls of the truck bed.

Container 10 has a rectangular receptacle 12 and a lid 14 that opens to permit access to the interior of container 10. Lid 14 is attached to receptacle 12 via a hinge 16, which is typically a continuous or piano hinge extending the length of receptacle 12. Also, container 10 is provided with a lift cylinder or gas spring 18 mounted to the rear wall of receptacle 12. Gas spring 18 may support lid 14 in the open position shown in FIG. 1. In some prior art containers 10, two or more gas springs 18 are provided.

Storage containers also typically include a locking system to secure the lid in a closed position. For example, container 10 includes two latches 20 disposed in the front wall of receptacle 12. When lid 14 is in the closed position, locking members in latches 20 engage staples 22 on lid 14. Latches 20 include paddle handles 24 which, when lifted, cause the locking members to disengage from staples 22 to allow lid 14 to open. Locks 26 are also provided in latches 20 such that, when locks 26 are locked, paddle handles 24 cannot be lifted. Thus, lid 14 may be maintained in the closed position.

Other locking systems have also been used with storage containers. In particular, a "horizontal" locking system typically employs a padlock as a latching mechanism for the lid. The padlock, which is located at one end of the receptacle, interacts with an elongated latch rod that is slidably disposed adjacent the front wall of the receptacle. When the padlock is locked and the container is in the closed position, the padlock body blocks longitudinal movement of the latch rod. When the padlock is unlocked, an end of the latch rod can pass between the shackle of the padlock and the padlock body to move the latch rod to a release position. Typically, a lever is used to manually move the latch rod between the latched and release positions after the padlock is unlocked.

Additional background information on locking systems used with storage containers is provided in commonly-assigned U.S. Patent App. Pub. No. 2008/0110893, entitled "Lock System for a Container," and commonly-assigned U.S. Pat. No. 7,416,228, entitled "Container with Adjustable Rotary Lock," both of which are incorporated herein by reference in their entireties for all purposes.

SUMMARY OF THE INVENTION

The present invention recognizes and addresses disadvantages of prior art constructions and methods. Embodiments of the present invention provide a detent mechanism for a container. In one aspect, the present invention provides a container comprising a housing comprising a closed end, an open end opposite the closed end, and first and second side walls defining a portion of a perimeter of the open end. The container also comprises a lid comprising a top surface and a lip depending from the top surface. The lid is pivotably coupled with the housing and configured to rotate between a first position covering the open end, a second position substantially exposing the open end, and an intermediate position between the first and second positions. The container further comprises at least one detent mechanism disposed between the lip and one of the side walls. The at least one detent mechanism is configured to arrest the rotation of the lid at each of the positions.

According to a further aspect, the present invention comprises a method of making a container. The method comprises forming a housing comprising a closed end, an open end opposite the closed end, and first and second side walls defining a portion of a perimeter of the open end. The method further comprises coupling a lid with the housing. The lid comprises a top surface and a lip depending from the top surface. The lid is configured to move between a first position covering the open end, a second position substantially exposing the open end, and an intermediate position between the first and second positions. The method also comprises disposing at least one detent mechanism between the lip and one of the side walls. The at least one detent mechanism is configured to arrest the motion of the lid at each of the positions.

According to a further aspect, the present invention provides a container comprising a housing comprising a closed end, an open end opposite the closed end, and first and second side walls defining a portion of a perimeter of the open end. The container also comprises a lid comprising a top surface and a lip depending from the top surface. The lid is pivotably coupled with the housing and configured to rotate absent a hinge between a first position covering the open end, a second position substantially exposing the open end, and an intermediate position between the first and second positions. Finally, the container comprises means for arresting the rotation of the lid at each of the positions. The lid is pivotably coupled with a first bolt connecting the lid and the first side wall and with a second bolt connecting the lid and the second side wall. The lid rotates about an axis defined by the first and second bolts. In some embodiments, the means for arresting the rotation of the lid at each of the positions may be positioned on an inner surface of one of the first or second container side walls.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 6A is a top view of a latch rod of a locking mechanism according to an embodiment of the present invention.

FIG. 6B is a front view of the latch rod of FIG. 6A.

FIG. 6C is a detail view of the first intermediate rod section of the latch rod shown in FIG. 6B.

FIG. 6D is a perspective view of the latch rod of FIG. 6A.

Figure 1:
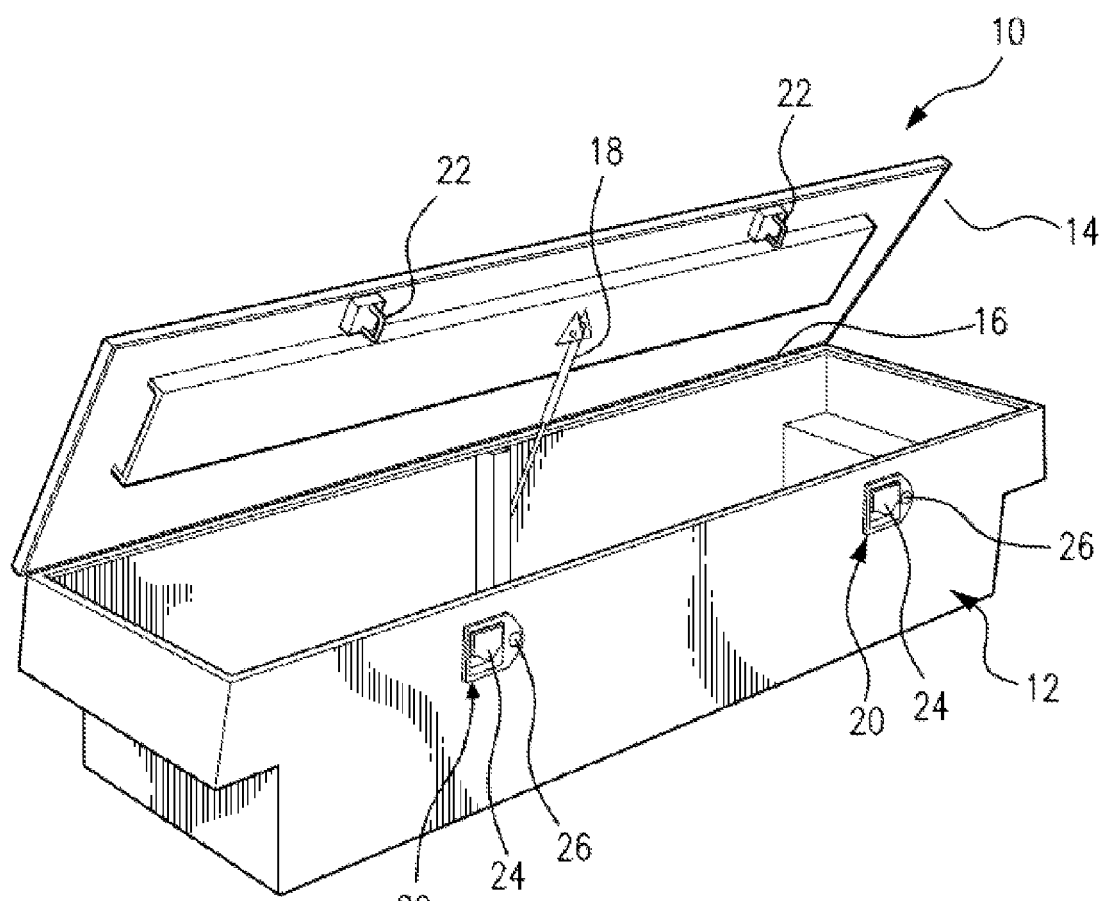
FIG. 1 is a perspective view of a prior art container in an open position.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Some embodiments of the present invention are particularly suitable for use in truck boxes adapted for mounting to a truck, and the below discussion will describe preferred embodiments in that context. However, those skilled in the art will understand that the present invention is not so limited. In fact, it is contemplated that the present invention be used with any suitable container.

Embodiments of the present invention provide a detent mechanism adapted to provide incremental rotation of the container lid. The lid is preferably adapted to rotate without the need for a hinge between the container housing and the lid. Embodiments of the present invention further provide a locking mechanism adapted for use with the container to lock and unlock the container lid. Generally, the locking mechanism may comprise an elongated latch rod which engages at least one strike plate. Horizontal and vertical planar sections of the latch rod preferably engage corresponding horizontal and vertical slots in the at least one strike plate to lock and unlock the container lid.

Figure 2:
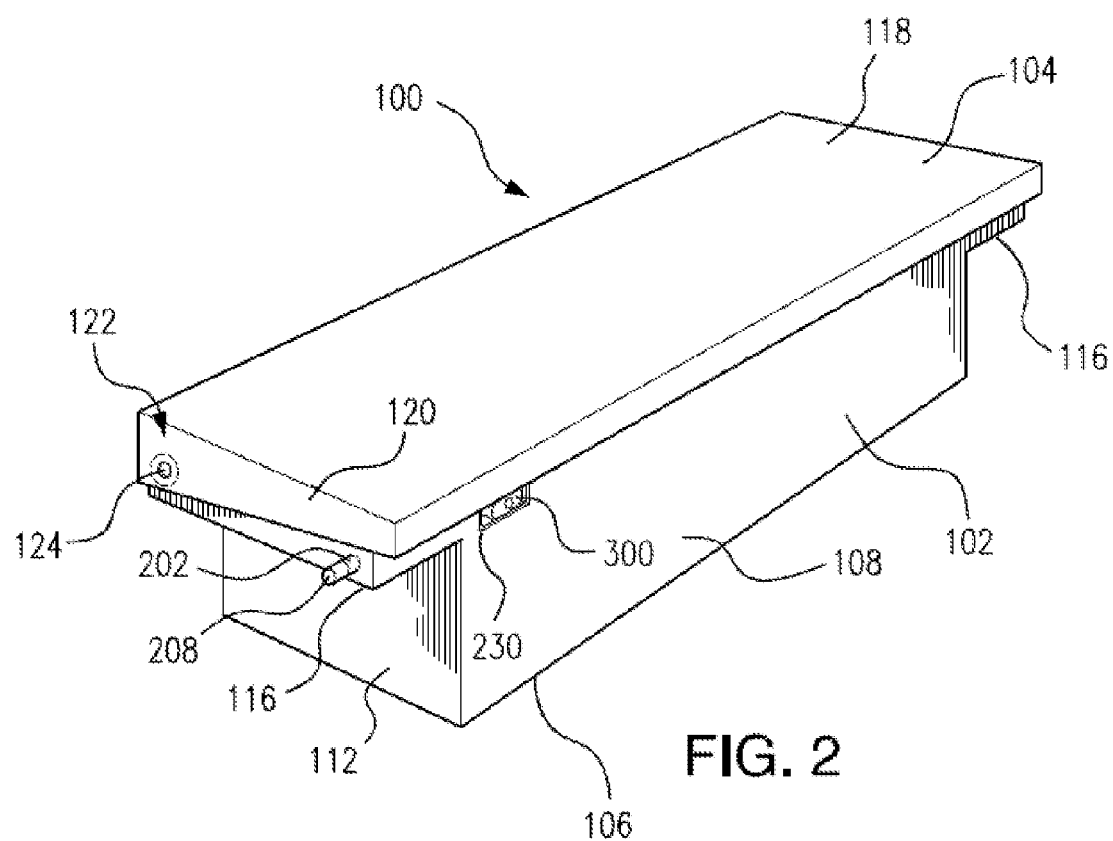
FIG. 2 is a perspective view of a container in a closed position according to an embodiment of the present invention.
Figure 3:
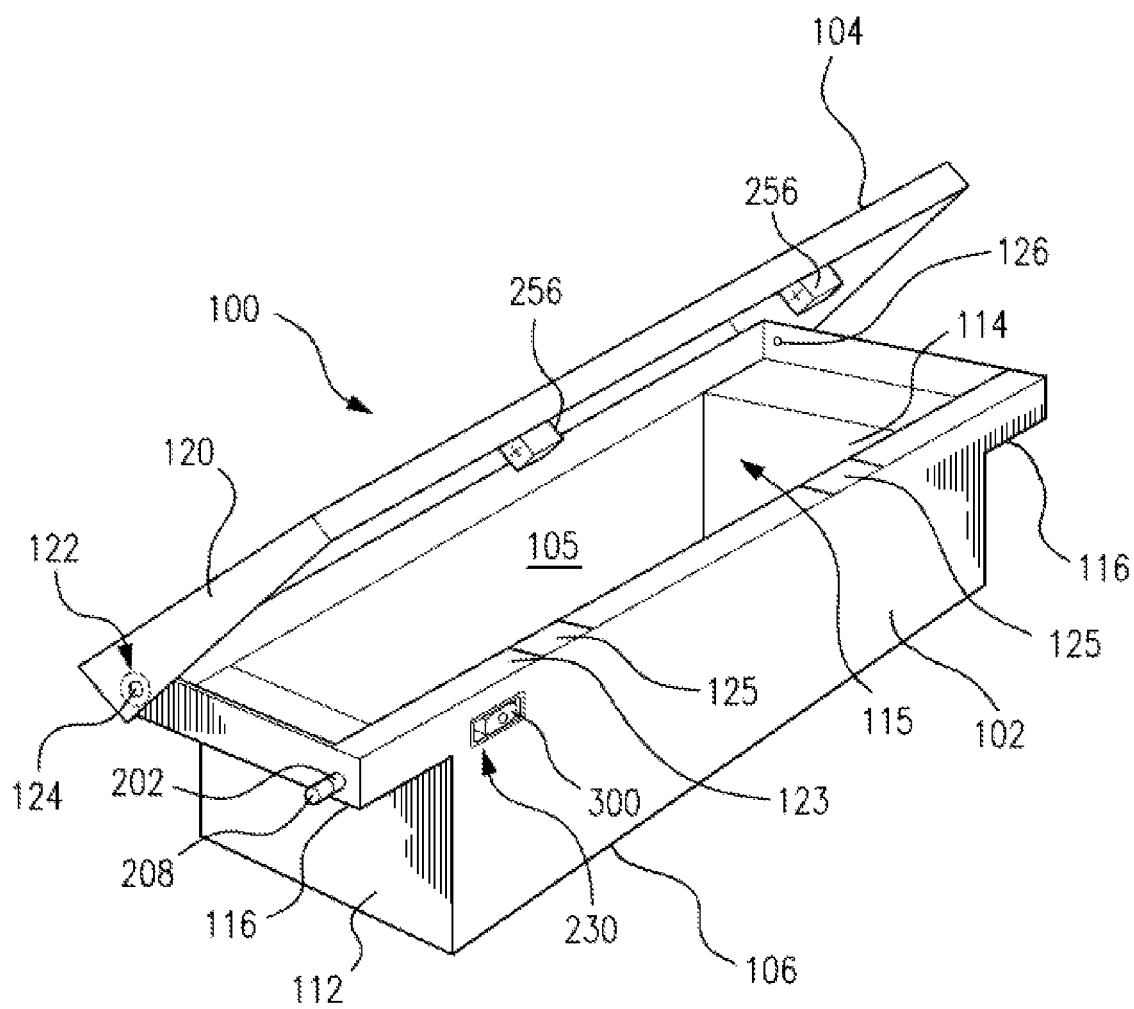
FIG. 3 is a perspective view of the container of FIG. 2 in an open position.

More particularly, FIG. 2 is a perspective view of a container 100 in a closed position according to an embodiment of the present invention. FIG. 3 is a perspective view of container 100 in an open position. Referring to the figures, container 100, which in a preferred embodiment is adapted for use as a truck box, may comprise a housing 102 and a lid 104 pivotably coupled with housing 102. Lid 104 may open to permit access to the interior 105 of container 100. Housing 102 comprises a closed end 106, a front wall 108, a rear wall 110, and first and second lateral opposing side walls 112, 114, all of which merge at their edges to form a rectangular box having an open end 115. Also, in the illustrated embodiment, housing 102 defines winged portions 116 which extend laterally from the upper portions of first and second side walls 112, 114. Winged portions 116 may overlie the walls of a truck bed to provide additional storage space. Those skilled in the art will appreciate, however, that winged portions 116 need not be provided in all embodiments.

Lid 104 may comprise a rectangular top surface 118 and a lip 120 depending from the periphery of top surface 118. The inner peripheral dimensions of lip 120 may preferably be slightly greater than the outer peripheral dimensions of the open end 115 of housing 102 such that when lid 104 is in a closed position, lip 120 partially overlaps front wall 108, rear wall 110, and first and second side walls 112, 114.

In a preferred embodiment, both housing 102 and lid 104 are formed from aluminum, but in other embodiments housing 102 and lid 104 may be formed of sheet steel or the like or another suitable material with similar strength and durability. In some embodiments, the material of either or both of housing 102 and lid 104 may comprise a three dimensional pattern, such as a raised tread pattern, to provide additional strength and structural reinforcement to container 100.

Those skilled in the art will recognize that the housing 102 and lid 104 may take other configurations. For example, winged portions 116 may be omitted, or housing 104 may be square or oblong rather than rectangular. Further, housing 102 may be oriented vertically, such that the open end 115 thereof faces forwardly rather than upwardly, and such that lid 104 forms the front of container 100 rather than the top.

As described in more detail below, one embodiment may comprise at least one detent mechanism adapted to provide incremental rotation of a container lid relative to the container housing. The incremental rotation of the lid relative to the housing preferably occurs between a plurality of predetermined angular positions, for example between 0° and 90°. Further, the detent mechanism preferably arrests rotation of the lid 104 at each of the positions such that the lid may not close under the force of its own weight or a predetermined additional force, such as force from wind or the weight of tools hanging from lid 104. In the illustrated embodiment, for example, a detent mechanism 122 is disposed between lip 120 and first side wall 112. In alternative embodiments, detent mechanism 122 may be located between lip 120 and second side wall 114. Further, in some preferred embodiments, detent mechanism 122 may be provided adjacent both first and second side walls 112, 114.

The present invention may further comprise a locking mechanism adapted for use with a container. This aspect is described in more detail with reference to FIGS. 6A-12, below. Generally, as shown in the illustrated embodiment, the locking mechanism may be mounted to container 100 via a guide 123. Guide 123 comprises a generally C-shaped channel that is mounted to and extends transversely behind an upper portion of front wall 108. Guide 123, which may be welded to front wall 108 or otherwise attached with suitable fasteners, may define two apertures 125. As described below, apertures 125 may expose portions of the locking mechanism for engagement with strikers 256 coupled to lid 104.

Finally, lid 104 may be coupled to housing 102 via bolts 124, 126. In particular, bolt 124 may pass through corresponding apertures in lip 120 and detent mechanism 122 and may be received in a threaded aperture in first side wall 112. Likewise, bolt 126 may pass through a corresponding aperture in lip 120 diametrically opposite bolt 124 and may be received in a threaded aperture in second side wall 114. In other embodiments, bolts 124, 126 may also pass through side walls 112, 114, respectively, and engage a nut. In any case, lid 104 preferably pivots about an axis defined by bolts 124, 126.

Bolts 124, 126 are sized to permit rotation of lid 104 relative to housing 102. The relative size of bolts 124, 126 may depend on whether more than one detent mechanism 122 is provided, in that a bolt passing through a detent mechanism in addition to a container lid and housing may be longer than a bolt that passes only through the container lid and housing. Those skilled in the art may select suitable bolts 124, 126, but in a preferred embodiment, bolts 124, 126 may be shoulder bolts. It will be appreciated that this arrangement eliminates the need for a hinge or gas spring between lid 104 and housing 102 and may thus reduce maintenance and expense, as well as provide additional room in interior 105 of container 100.

Additionally, this arrangement changes the pivot point between lid 104 and housing 102. A container with a hinge will rotate about the hinge, which is typically at a junction formed by an end of the lid and the end of one of the container walls. As described above, lid 104 pivots about the axis defined by bolts 124, 126.

Figure 4:
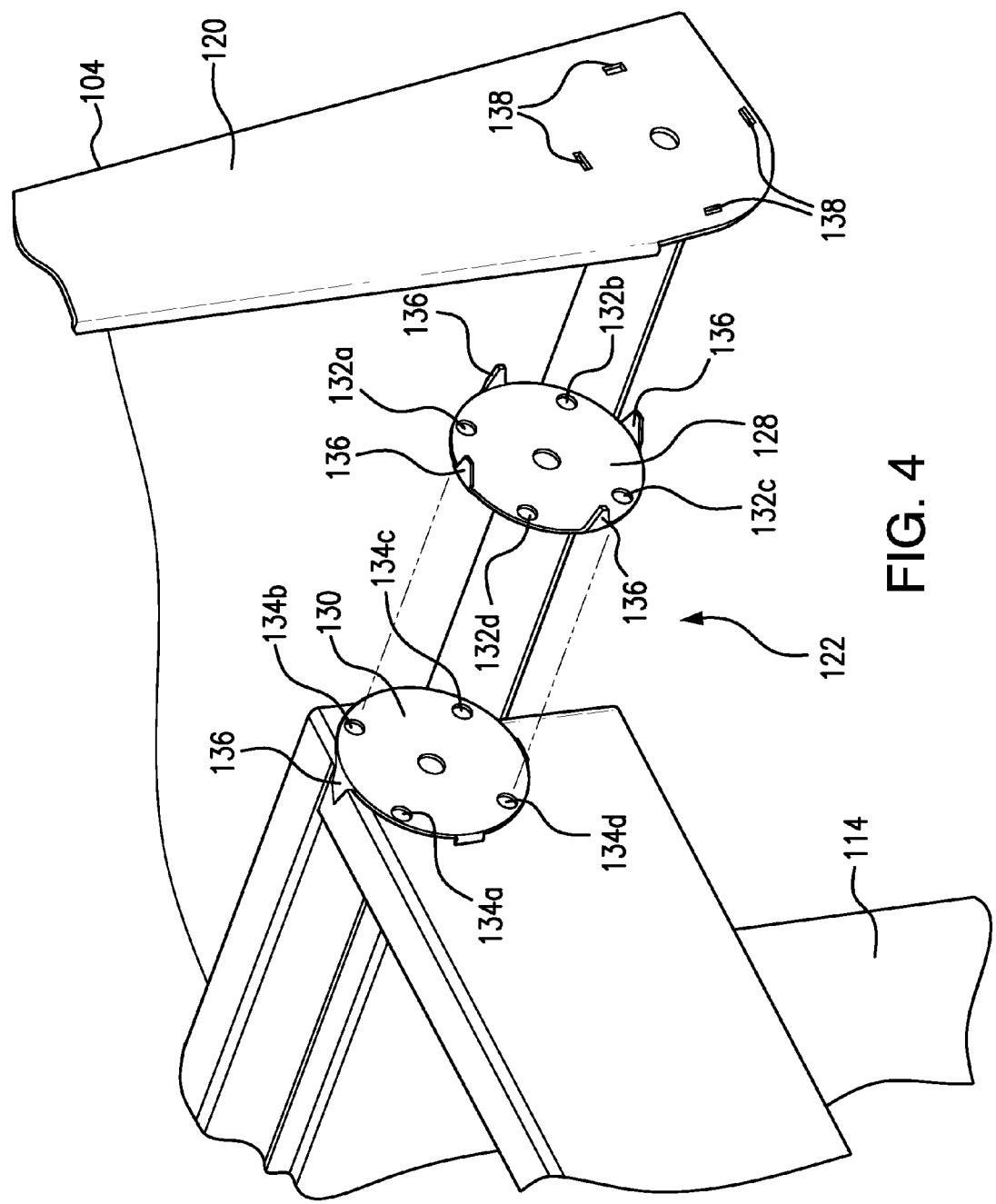
FIG. 4 is an exploded view of a detent mechanism adapted for use with the container of FIG. 2 according to an embodiment of the present invention.

FIG. 4 is an exploded view of detent mechanism 122 adapted for use with container 100 according to an embodiment of the present invention. In this embodiment, detent mechanism 122 is provided adjacent second side wall 114. Detent mechanism 122 preferably comprises a first plate 128 and a second plate 130 adapted for relative rotation about a common axis, such as the longitudinal axis of bolt 126. First and second plates 128, 130 may preferably be disk-like structures formed of spring steel or the like. However, those skilled in the art will appreciate that first and second plates 128, 130 may take any suitable shape and may be formed of any suitably strong material, including aluminum and plastic.

First plate 128 may be affixed to an inner surface of lip 120 by any suitable method, including fasteners or adhesive. Second plate 130 may be similarly affixed to second side wall 114. For example, in the illustrated embodiment, first and second plates 128, 130 may define a plurality of teeth 136 adapted to be fixedly received in slots 138 defined in lid 104 and second side wall 114. As described above, bolt 126 may be received through corresponding apertures in lip 120 and first and second plates 128, 130 to engage second side wall 114.

First and second plates 128, 130 each preferably define one or more surface features which arrest rotation of first plate 128 relative to second plate 130 (and thus lid 104 relative to housing 102) at predefined angular increments. In the illustrated embodiment, for example, first and second plates 128, 130 define surface features which may arrest the rotation of plate 128 in 90° increments.

More specifically, and referring again to the embodiment illustrated in FIG. 4, first plate 128 defines four projections 132a-d equally spaced about the circumference of first plate 128. on a surface adjacent second plate 130 when detent mechanism 122 is assembled. Desirably, projections 132a-d may be formed of the same material as plate 128 and may be hemispherical in shape. Those skilled in the art will understand, however, that projections 132 may be formed of many suitable materials and take many shapes within the scope of the present invention.

Correspondingly, second plate 130 defines four depressions 134a-d equally spaced about its circumference. Depressions 134a-d may be formed on the surface of second plate 130 adjacent plate 128 when detent mechanism 122 is assembled, and thus depressions 134a-d may be adapted to receive projections 132a-d. In particular, the shape of depressions 134a-d may preferably be substantially the inverse of projections 132a-b and the diameter between depressions 134a-c and 134b-d may be equal to the diameter between projections 132a-c and 132b-d.

Second plate 130 is preferably affixed to second side wall 114 such that a vector extending between the center of depression 134b and the center of depression 134a is parallel to the top edge of second side wall 114. Likewise, first plate 128 is preferably affixed to the inner surface of lip 120 such that when lid 104 is in a closed position, projections 134a-d engage depressions 134a-d, respectively. Thus, even when lid 104 is in a closed position and container 100 is unlocked, the detent mechanism may maintain lid 104 in the closed position until a user applies an opening force.

To move lid 104 to the open position shown in FIG. 4, a user rotates lid 104 upward, causing projections 132a-d to disengage from depressions 134a-d, respectively. When first plate 128 has rotated 90° with respect to second plate 130, projection 132a will engage depression 134b, projection 132b will engage depression 134c, projection 132c will engage depression 134d, and projection 132d will engage depression 134a. Detent mechanism 122 may thus hold lid 104 at this angular position until a user desires lid 104 to close. The force applied by a user is sufficient for projections 132a-d to disengage from depressions 134a-d, respectively.

Notably, the respective projections and depressions described above may be reversed, for example such that second plate 130 defines one or more projections and first plate 128 defines one or more depressions. Likewise, in some embodiments, first and second plates 128, 130 may each define both projections and depressions.

Figure 5:
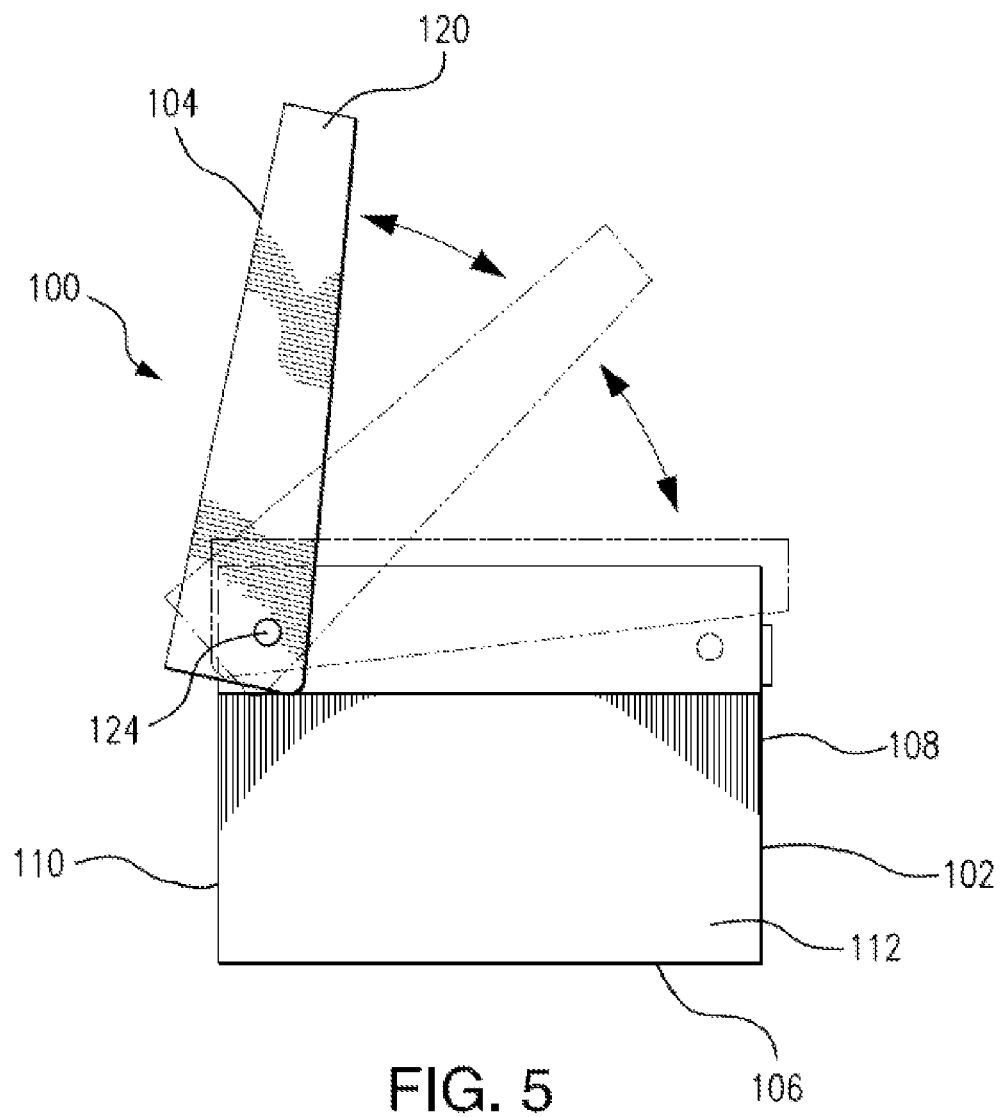
FIG. 5 is a side view of the container of FIG. 2 illustrating incremental rotation of the container lid via a detent mechanism according to an embodiment of the present invention.

It will be appreciated that the number of surface features provided on each plate 128, 130 may depend on the number of or angle between desired stop positions and the force needed to arrest rotation of lid 104 at each position. In some embodiments where less force is required, a single projection on one plate may interact with only two depressions defined in the other plate spaced 90° apart. Alternatively, according to a further embodiment, FIG. 5 illustrates incremental rotation of lid 104 wherein the detent mechanism is adapted to arrest rotation of first plate 128 at increments of 45°. Those skilled in the art will appreciate that the detent mechanism of the present invention may be adapted to provide any number of angular stop positions, and may be calibrated to increase or decrease the force necessary to continue the rotation of first plate 128 once rotation has been arrested.

Also, in some embodiments, second plate 130 may define one or more grooves (not shown) connecting depressions 134a-d. In other words, the grooves may define the path traveled by projections 132a-d as first plate 128 is rotated with respect to second plate 130. The depth of the grooves is preferably less than the depth of each depression 134a-d.

According to a further embodiment, the plates of the detent mechanism may not rotate about a common axis. Likewise, the detent mechanism need not be centered about the coupling between the container lid and the container housing. As an example, although the embodiment of the detent mechanism illustrated in FIGS. 3 and 4 is adapted to be attached to the outer surface of a side wall of the container housing, in alternative embodiments an analogous detent mechanism may instead be positioned on the container side wall's inner surface. In this case, a plate affixed to the underside of lid 104 may take the form of a quarter circle. Projections on this plate may interact with depressions defined in a plate affixed to the inner surface of first or second side walls 112, 114. Those skilled in the art will appreciate that other arrangements are contemplated.

Moreover, other types of detent mechanisms are within the scope of the present invention. For example, in some embodiments, the detent mechanism may comprise a single plate affixed to one of the container lip or first or second side walls which engages surface features defined by the other of the container lip or first or second side walls. Alternatively, the detent mechanism may comprise any suitable device known to those skilled in the art for arresting rotation of a container lid relative to the container housing at predefined angular positions, including a lever interacting with a notched wheel or groove, a ball detent, or a ratchet.

Notably, the above-described detent mechanism may have fewer moving parts than prior art support mechanisms for container lids, such as gas springs. Thus, the detent mechanism may be less expensive to manufacture.

As noted above, the present invention may also comprise a locking mechanism. Embodiments of the locking mechanism will be described with reference to the container 100 described herein. It should be understood, however, that the locking mechanism may be utilized in other suitable applications. First, a locking mechanism 200 may include an elongated latch rod. For example, FIGS. 6A-6D provide respective top, front, detail, and perspective views of an elongated latch rod 202 according to an embodiment of the present invention. Latch rod 202 can be made from tube steel with various cross-sections. Alternatively, latch rod 202 can be made from steel bar. In addition to metal, latch rod 202 can be formed of other suitable materials, such as high-strength plastics or composites.

More particularly, latch rod 202 may be substantially tubular and include a proximal end 204 and a distal end 206. Proximal end 204 and distal end 206 are disposed on opposite ends of latch rod 202. As better seen in FIGS. 2 and 3, proximal end 204 may penetrate and extend beyond first side wall 112 of container 100 in an unlocked position. In a locked position proximal end 204 may be flush with first side wall 112. In another embodiment, proximal end 204 may extend slightly beyond first side wall 112 in a locked position. In still another embodiment, proximal end 204 may be withdrawn within housing 102 in a locked position.

Latch rod 202 may be housed substantially in interior 105 of housing 102. For example, latch rod 202 may be disposed in guide 123, described above. Alternatively, a plurality of brackets may be affixed to and extend transversely from an upper portion of front wall 108. The brackets may define apertures to slidably receive and support latch rod 202. In a further embodiment, the orientation of latch rod 202 may be reversed such that proximal end 204 penetrates and extends beyond second side wall 114 of container 100.

A cap 208 having a substantially planar end can be placed or formed on the proximal end 204 to facilitate manually depressing the latch rod 202. Additionally, cap 208 can include pigmentation or coloring that is distinct from the rest of the container 100 such that cap 208 serves as an indicator that locking mechanism 200 is in a locked or unlocked configuration. Distal end 206 of latch rod 202 may abut the second side wall 114 and may be enclosed by housing 102. Alternatively, distal end 206 of latch rod 202 may abut a bracket disposed in the interior 105 of housing 102.

Latch rod 202 may define a recessed rod segment 210 between proximal end 204 and distal end 206. Recessed rod segment 210 is preferably adjacent to proximal end 204, and its length may be slightly longer than the body of a portable lock. As described in more detail below, recessed rod segment 210 preferably comprises an indentation 212 adapted to engage the portable lock when locking mechanism 200 is in a locked position. Indentation 212 in latch rod 202 is preferably sufficiently deep to prevent horizontal translation of latch rod 202 when the indentation and portable lock are engaged.

Disposed between recessed rod segment 210 and distal end 206 may be a first intermediate rod segment 214. First intermediate rod segment 214 may include a horizontal planar section 216 and a vertical planar section 218. The horizontal and vertical planar sections 216, 218 are adjacent to one another. As shown in FIG. 6C, a transition 220 between horizontal planar section 216 curves upwardly toward the vertical planar section 218.

Recessed rod segment 210 and horizontal and vertical planar sections 216, 218 may be formed by flattening portions of latch rod 202. Alternatively, where latch rod 202 is made from solid bar, the recessed rod segment 210 and horizontal and vertical planar sections 216, 218 may be formed by machining. Another alternative may include casting or molding latch rod 202 in a desired shape and configuration.

In the illustrated embodiment, disposed between first intermediate rod segment 214 and distal end 206 is a second intermediate rod segment 222. Second intermediate rod segment 222 is preferably similar to first intermediate rod segment 214, and thus segment 222 may include a horizontal planar section 224 and a vertical planar section 226. The horizontal and vertical planar sections 224, 226 are adjacent to one another. A transition 228 may be formed between horizontal and vertical planar sections 224, 226 as horizontal planar section 224 curves upwardly toward vertical planar section 226. As described below, second intermediate rod segment 222 may not be provided in some embodiments.

Finally, a biasing element 229, such as a compression spring, may be coupled with distal end 205 of latch rod 202. However, those skilled in the art will appreciate that biasing element 229 may be located at any position along latch rod 202. Generally, biasing element 229 may engage a bracket or second side wall 114 on one end and a stop, or collar, located on latch rod 202 on its other end. Thereby, latch rod 202 may be biased toward the unlocked position.

Figure 7:
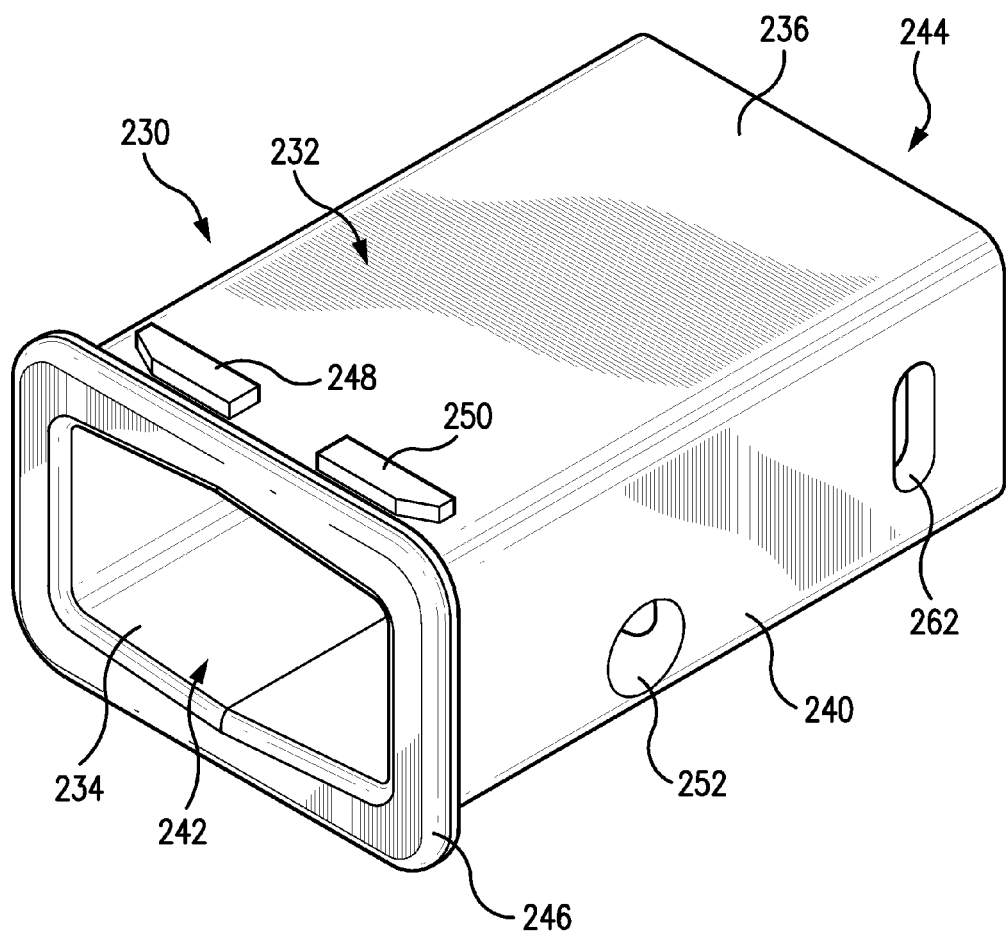
FIG. 7 is a perspective view of a lock receptacle of a locking mechanism according to an embodiment of the present invention.

Referring now to FIG. 7, locking mechanism 200 may also comprise a lock receptacle 230. Lock receptacle 230 may be coupled with and penetrate front wall 108 of housing 102. In one embodiment, lock receptacle 230 may be positioned in a lock receptacle receiving slot formed in container 100. Lock receptacle 230 may be disposed proximate to first side wall 112 of housing 102. Those skilled in the art will appreciate that lock receptacle 230 may be positioned at any location in front wall 108 of housing 102. In a preferred embodiment, receptacle 230 may be formed of plastic or another nonmetallic material. Lock receptacle 230 may also be formed of the same material as the housing 102, steel, or any other suitable material.

As described below with reference to FIGS. 11-12, lock receptacle 230 may preferably be attached to housing 102 via a retaining clip. In other embodiments, lock receptacle 230 may formed integrally with housing 102. In a further embodiment, lock receptacle 230 is formed separately and subsequently fixedly attached to housing 102, such as by welding. Those skilled in the art will appreciate, however, that it may be difficult to weld a steel receptacle to an aluminum housing.

In any case, lock receptacle 230 is preferably configured to accommodate a portable lock, such as a padlock. For example, in the embodiment illustrated in FIGS. 10A-10B, a padlock 300 is positioned within lock receptacle 230. Alternatively, a permanent lock (not shown) can be used. A permanent lock generally refers to a lock that is formed as an integral part of housing 102.

The lock receptacle 230 may comprise a sleeve 232. Sleeve 232 can include a base 234 and a cover 236 disposed in facing opposition to base 234. Proximal and distal walls 238, 240 may extend between and join base 234 and cover 236. In some embodiments, however, cover 236 may not be provided, in which case lock receptacle 230 may resemble a U-channel.

Base 234, cover 236, and proximal and distal walls 238, 240 may define first and second open ends 242, 244. A flange 246 may be coupled with or disposed around open end 242. Flange 246 preferably abuts the outer surface of a wall of a container adapted to receive receptacle 230. Cover 236 and base 234 preferably include at least one surface feature proximate to flange 246. Here, for example, a top surface of cover 236 includes first and second projections 248, 250. Although not visible in FIG. 7, similar, oppositely disposed projections are preferably disposed on a bottom surface of base 234. As described below, projections 248, 250 and the projections on base 234 may be adapted to receive a retaining clip after receptacle 230 is installed in container 100.

As shown, distal wall 240 defines an aperture 252. Proximal wall 238 defines an identical aperture 254 in alignment with and disposed in facing opposition to aperture 252. Apertures 252, 254 are preferably adapted to slidably receive latch rod 202. This configuration permits the travel of latch rod 202 through proximal and distal walls 234, 236 when the portable lock is in an unlocked position.

Figure 8:
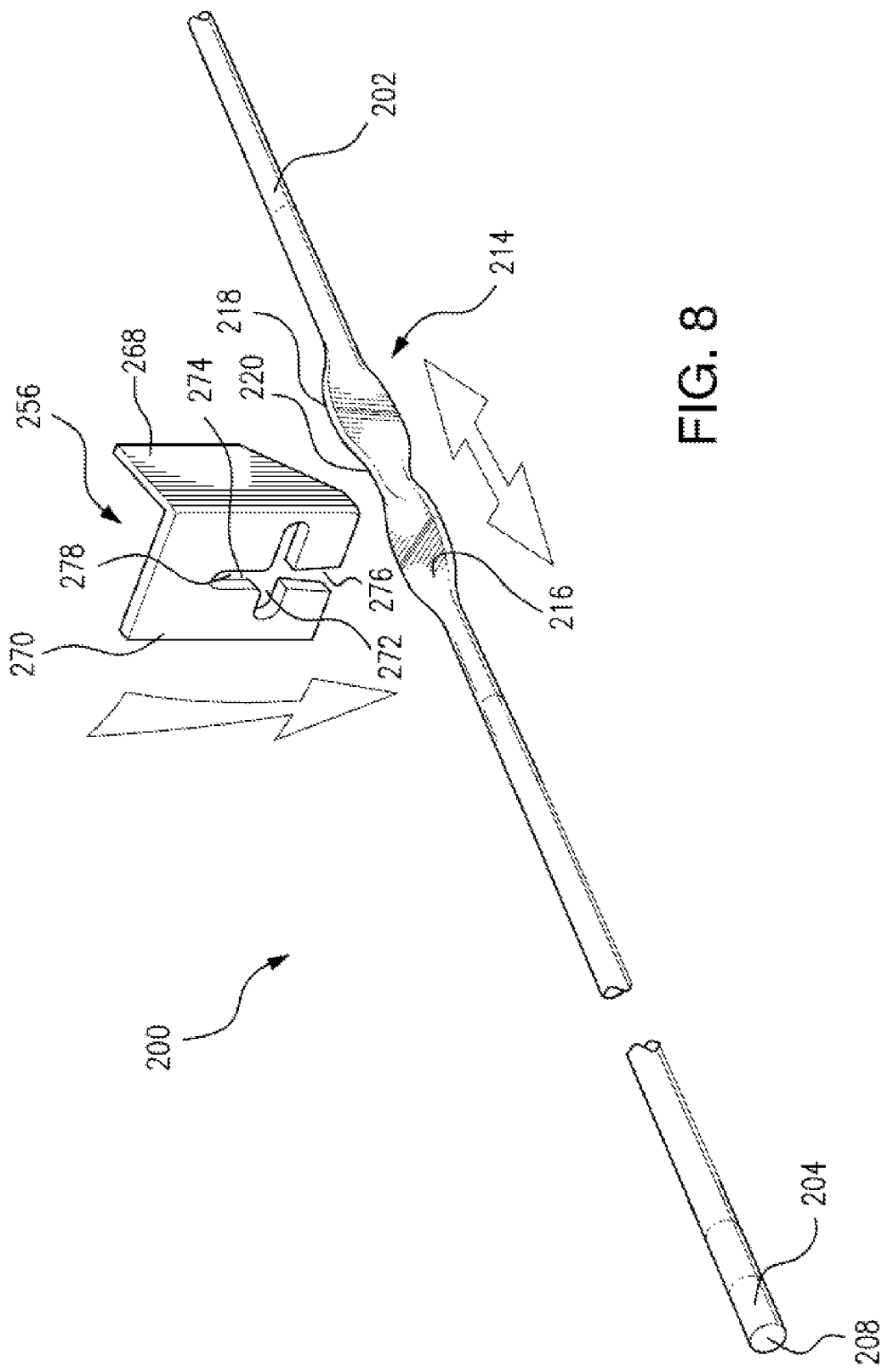
FIG. 8 is a perspective view of a striker adapted to engage the latch rod of FIGS. 6A-6D according to an embodiment of the present invention.

Additionally, locking mechanism 200 may comprise at least one striker. In this regard, FIG. 8 is a perspective view of a striker 256 adapted to engage latch rod 202 according to an embodiment of the present invention. Latch rod 202 is shown in partial section in FIG. 8 to facilitate illustration, and thus lock receptacle 230 and recessed rod segment 210 are not shown. In a preferred embodiment, striker 256 is formed of aluminum. However, striker 256 can be cut from a structural steel L-angle-section or be formed by welding two sections of structural steel or by bending a unitary piece of metal into its desired shape. In another embodiment, striker 256 is formed by molding or casting and can be formed of other suitable materials, such as high-strength plastics or composites. As shown in FIG. 8, striker 256 includes a support plate 268 and a strike plate 270 orthogonal to support plate 268. Support plate 268 can be fixedly attached to an interior surface of lip 120 by welding or by suitable fasteners. Likewise, strike plate 270 can be fixedly attached to an underside of lid 104.

In the illustrated embodiment, strike plate 270 defines a horizontal slot 272 and a vertical slot 274 intersecting at right angles, forming a cross-like aperture in strike plate 270. Vertical slot 274 includes an open end 276 and a closed end 278 opposite open end 276. Closed end 278 of vertical slot 274 faces, and is proximate to, lid 104. When lid 104 is in a closed position, open end 276 faces latch rod 202 and, thus, interior 105 of housing 102. Open end 276 of vertical slot 274 may be flared to receive vertical planar section 218 of first intermediate rod segment 214 of latch rod 202.

Although not illustrated in FIG. 8 to facilitate description, locking mechanism 200 preferably comprises two strikers 256, each adapted to engage one of first and second intermediate rod segments 214, 222 of latch rod 202 when lid 104 is in a closed position. (See FIG. 3). However, those skilled in the art will appreciate that two strikers 256 are not required. Thus, in one embodiment, only one striker 256 engages a latch rod comprising only one intermediate rod segment.

Figure 9:
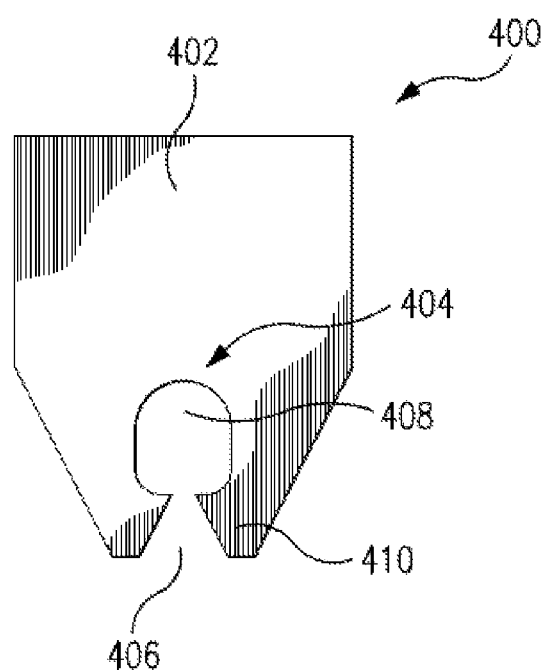
FIG. 9 is a front view of a striker according to an alternative embodiment of the present invention.

Those skilled in the art will appreciate that the aperture(s) in the striker adapted to engage intermediate rod segments of the latch rod may take other shapes within the scope of the present invention. For example, FIG. 9 is a front view of a striker 400 according to an embodiment of the present invention. Here, striker 400, which includes a strike plate 402, defines a vertical slot 404. Vertical slot 404 includes an open end 406, a closed end 408, and a neck 410. The width of vertical slot 404 may narrow from open end 406 to neck 410, where the width is just wide enough to receive vertical planar section 218 of latch rod 202. Continuing upward past neck 410, the width of vertical slot 404 preferably increases to receive horizontal planar section 216. It can be seen that when locking mechanism 200 is in a locked position such that striker 400 engages horizontal planar section 216, neck 410 interferes with horizontal planar section 216 to prevent opening of lid 104.

Figure 10A:
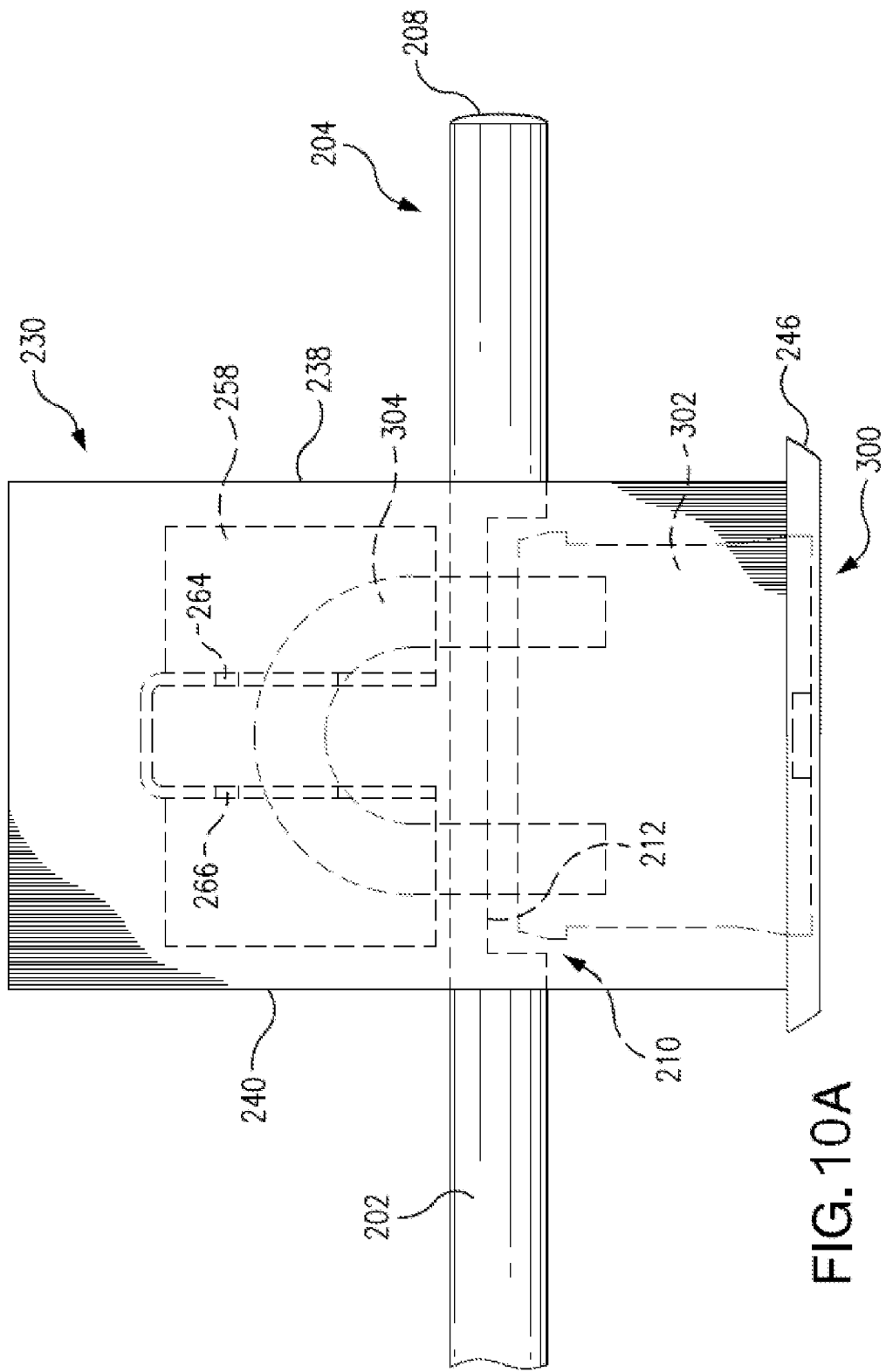
FIG. 10A is a schematic bottom view of the lock receptacle of FIG. 7 illustrating engagement of the latch rod of FIGS. 6A-6D with a padlock when the locking mechanism is in a locked position.
Figure 10B:
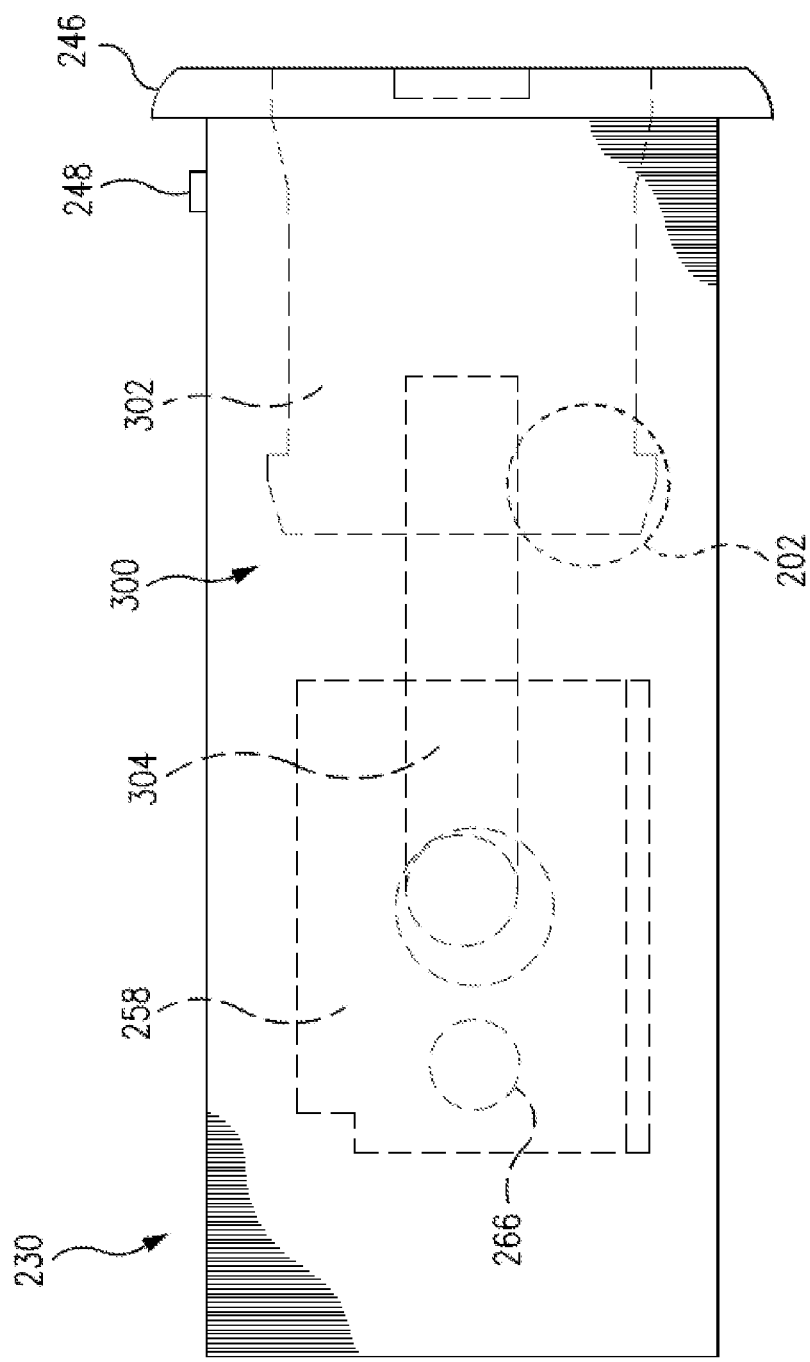
FIG. 10B is a schematic side view of the lock receptacle of FIG. 10A.

FIGS. 10A-10B provide respective schematic bottom and side views of lock receptacle 230 illustrating engagement of latch rod 202 with padlock 300 when locking mechanism 200 is in a locked position. A shackle retaining bracket 258 may be removably coupled with lock receptacle 230. For example, proximal and distal walls 238, 240 may define opposing slots 260, 262, respectively, adapted to receive a bolt. (See FIGS. 7 and 12). Correspondingly, shackle retaining bracket 258 may define one or more apertures 264, 266 in alignment with slots 260, 262 adapted to receive the bolt. Those skilled in the art will appreciate that other methods of coupling shackle retaining bracket 258 to receptacle 230 are contemplated.

As noted above, lock receptacle 230 may be adapted to receive a portable lock. In the illustrated embodiment, padlock 300 is positioned within lock receptacle 230. Padlock 300 may include a padlock body 302 and a shackle 304 extending from the padlock body 302. Padlock body 302 is supported by base 234 of lock receptacle 230. Shackle retaining bracket 258 is configured to receive and retain, or fixedly secure, shackle 304 of padlock 302. Thus, shackle 304 may be fixedly secured to lock receptacle 230 via shackle retaining bracket 258.

With padlock 300 (and thus latch rod 202) in the locked position, lock body 302 is disposed in confronting engagement with indentation 212 in recessed rod segment 210. (The space between indentation 212 and lock body 302 is exaggerated in FIG. 10A for the purpose of illustration.) It will be appreciated that this configuration prevents movement of latch rod 202 between proximal and distal walls 238, 240 of lock receptacle 230.

Those skilled in the art will appreciate that alternative arrangements of the above-described locking mechanism are contemplated. As one example, the locking mechanism may be inverted such that latch rod 202 and lock receptacle 230 are disposed in or along lid 104 and striker 256 is mounted to an inner surface of front wall 108. In this case, the proximal end 204 of latch rod 202 may penetrate and extend beyond the lip 120 of the lid 104.

The operation of locking mechanism 200 will be described in reference to FIGS. 6A-10B. As noted above, biasing member 229 coupled to latch rod 202 preferably biases latch rod 202 toward an unlocked position. When lid 104 is in a closed position and locking mechanism 200 is in an unlocked position, lock body 302 is out of engagement with indentation 212 of recessed rod segment 210 in latch rod 202. Thus, vertical slots 274 of strikers 256 engage vertical planar section 218 of first intermediate rod segment 214 and vertical planar section 226 of second intermediate rod segment 222. In this position, a user may lift lid 104 without interference from strikers 256. Where locking mechanism 200 is provided in container 100, a user would need only to provide enough force to disengage detent mechanism 122.

When a user desires to lock locking mechanism 200, the user depresses cap 208 on proximal end 204 of latch rod 202 against the bias of biasing member 229. Latch rod 202 translates horizontally such that recessed rod segment 210 is aligned with (but not yet engaging) lock body 302 and horizontal planar sections 216, 224 of first and second intermediate rod segments 214, 222 engage horizontal slots 272 of strikers 256. The user then pushes padlock body 302 forward to engage shackle 304, thus causing lock body 302 to engage indentation 212 in recessed rod segment 210. In this position, a user cannot lift lid 104 because horizontal planar sections 216, 224 interfere with horizontal slots 272 of strikers 256.

Finally, when a user desires to again unlock locking mechanism 200, the user unlocks padlock 300 with a key (not shown). Because shackle 304 is fixed in lock receptacle 230, the user pulls padlock body with the key outward out of engagement with recessed rod segment 210. Because padlock body 302 no longer interferes with latch rod 202, biasing member 229 causes horizontal translation of latch rod 202. In particular, this causes horizontal planar sections 216, 224 of first and second intermediate rod segments 214, 222 to disengage from horizontal slots 272 of strikers 256 and vertical planar sections 218, 226 of first and second intermediate rod segments 214, 222 to engage vertical slots 274 of strikers 256. Thus, the user may again open lid 104.

Figure 11:
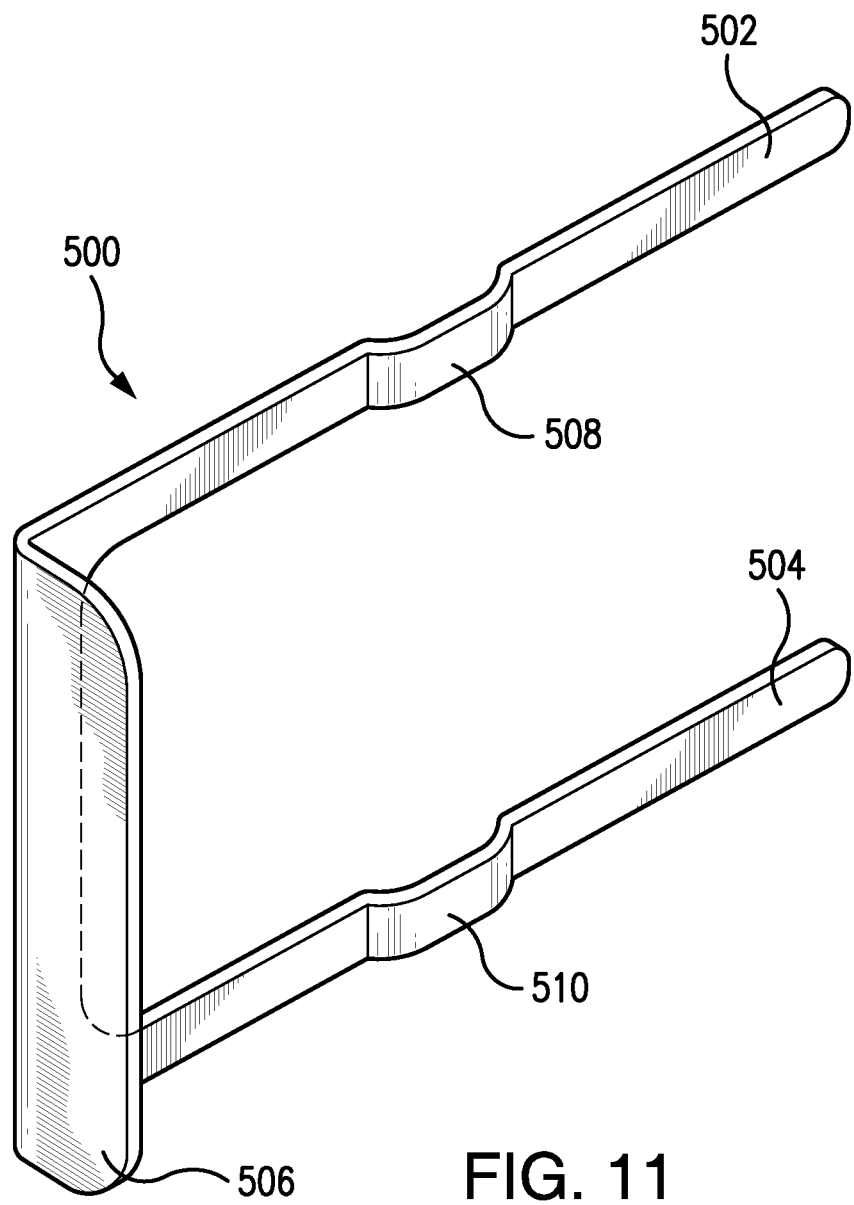
FIG. 11 is a perspective view of a retaining clip adapted to receive the lock receptacle of FIG. 7 according to an embodiment of the present invention.
Figure 12:
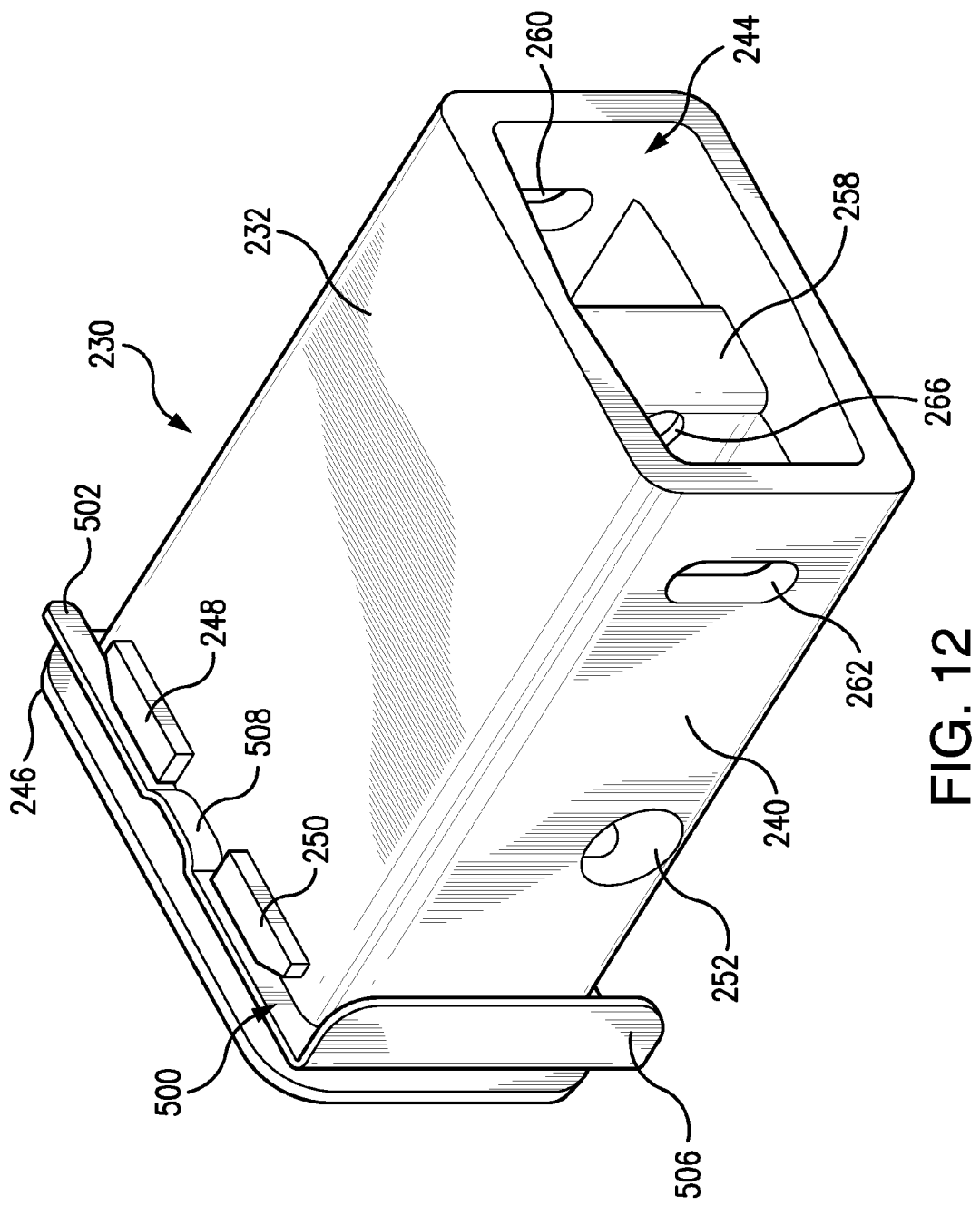
FIG. 12 is a perspective view illustrating assembly of the retaining clip of FIG. 11 and the lock receptacle of FIG. 7.

Referring now to FIGS. 11-12, an embodiment of the present invention also contemplates a method of installing lock receptacle 230 in a container housing. FIG. 11 is a perspective view of a retaining clip 500 adapted to receive lock receptacle 230 according to an embodiment of the present invention. Retaining clip 500 may be formed of any material of sufficient strength to maintain lock receptacle 230 in position in a container housing. In a preferred embodiment, for example, retaining clip 500 may be formed of spring steel.

Retaining clip 500 may be formed as a generally C-shaped structure comprising first and second legs 502, 504. A grasping tab 506 may extend between and join legs 502, 504. First and second legs 502, 504 preferably define tabs 508, 510, respectively. Tabs 508, 510 may be adapted for receipt between first and second protrusions 248, 250 formed on the top surface of cover 232 and the similar protrusions defined on a bottom surface of base 234, respectively.

FIG. 12 is a perspective view illustrating assembly of retaining clip 500 and lock receptacle 230. As noted above, lock receptacle 230 may be positioned in a lock receptacle receiving slot formed in container 100 such that flange 246 abuts an outer surface of a wall of container 100 and sleeve 232 extends into the interior 115 of container 100. A gasket may be provided between flange 246 and the outer surface. Then, the user may slide tabs 508, 510 of retaining clip 500 past protrusion 250 and the similar opposing protrusion on the bottom surface of base 234. Thus, retaining clip 500 may be positioned between an inside surface of a wall of container 100 and the surface features defined by lock receptacle 230.

Those skilled in the art will appreciate that installing lock receptacle 230 using retaining clip 500 allows lock receptacle 230 to be formed of a material dissimilar from that of container 100. In particular, this installation configuration may provide a "clean" interface between receptacle 230 and container 100 free of welds or weld spatter.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

That which is claimed:

1. A container comprising:
   a housing comprising a closed end, an open end opposite the closed end, and first and second side walls defining a portion of a perimeter of the open end;
   a lid comprising a top surface and a lip depending downwardly from the top surface, the lid being pivotably coupled with the housing and configured to rotate about an axis of rotation between a first position covering the open end, a second position substantially exposing the open end, and an intermediate position between the first and second positions, the lip being disposed outwardly of one of the first side wall and the second side wall along the axis of rotation; and
   at least one detent disposed in a space that is defined between the lip and the one of the side walls pivotably about the axis of rotation, wherein the at least one detent is configured to arrest the rotation of the lid at each of the positions,
   wherein the axis of rotation of the lid passes through the lip, the at least one detent and the one of the side walls, and the lid is pivotably coupled with the housing with a first bolt connecting the lip and the first side wall and with a second bolt connecting the lip and the second side wall, and the axis of rotation passes through the first and second bolts.

2. The container according to claim 1, wherein the lid rotates absent a hinge.

3. The container according to claim 1, wherein the lid is configured to rotate incrementally corresponding to the first position, the intermediate position, and the second position.

4. The container according claim 1, wherein the at least one detent comprises a first plate coupled with the side wall and a second plate facing the first plate and coupled with the lip.

5. The container according to claim 4, wherein a plurality of depressions are disposed in one of the first plate and the second plate.

6. The container according to claim 5, wherein a plurality of projections corresponding to the plurality of depressions are disposed in the other of the first plate and the second plate, the plurality of depressions configured to cooperatively engage the plurality of projections.

7. A container comprising:
a housing comprising a closed end, an open end opposite the closed end, and first and second side walls defining a portion of a perimeter of the open end;
a lid comprising a top surface and a lip depending downwardly from the top surface so that the lip is disposed outwardly of one of the side walls, the lid being pivotably coupled with the housing and configured to rotate about an axis of rotation between a first position covering the open end, a second position substantially exposing the open end, and an intermediate position between the first and second positions; and
at least one detent disposed in a space defined between the lip and the one of the side walls, wherein the at least one detent is configured to arrest the rotation of the lid at each of the positions,
wherein the axis of rotation of the lid passes through the lip, the at least one detent and the one of the side walls, wherein the at least one detent comprises a first plate coupled with the side wall and a second plate facing the first plate and coupled with the lip,
wherein a plurality of depressions are disposed in one of the first plate and the second plate, and a plurality of projections corresponding to the plurality of depressions are disposed in the other of the first plate and the second plate, the plurality of depressions configured to cooperatively engage the plurality of projections, and
wherein a groove is disposed in the surface of the one plate connecting the plurality of depressions to one another, the groove defined by a path traveled by the plurality of projections.

8. The container according to claim 7, wherein a depth of the groove is less than a depth of each of the plurality of depressions.

9. A container comprising:
a housing comprising a closed end, an open end opposite the closed end, and first and second side walls defining a portion of a perimeter of the open end;
a lid comprising a top surface and a lip depending downwardly from the top surface, the lid being pivotably coupled with the housing with a first bolt connecting the lid and the first side wall and with a second bolt connecting the lid and the second side wall, the first and second bolts being aligned with an axis of rotation, the lid being configured to rotate about the axis of rotation absent a hinge between a first position covering the open end, a second position substantially exposing the open end, and an intermediate position between the first and second positions, the lip being disposed outwardly of respective outwardmost extents of the first side wall and the second side wall; and
at least one detent disposed in a space that is defined between the lip and one of the side walls along the axis of rotation and that extends beyond the outwardmost extent of the one side wall, wherein the at least one detent is configured to arrest the rotation of the lid at each of the positions, and includes a plurality of depressions disposed in a first plate coupled with the side wall, and a plurality of projections disposed in a second plate coupled with the lip, the first and second plates disposed in facing opposition to one another, and the plurality of depressions cooperatively engaging with the plurality of projections,
wherein the axis of rotation of the lid passes through the lip, the detent, and the one of the side walls, and the lid is pivotably coupled with the housing absent a hinge.

10. The container according to claim 9, wherein the at least one detent comprises a first plate coupled with the side wall and a second plate facing the first plate and coupled with the lip.

11. The container according to claim 10, wherein a plurality of depressions are disposed in one of the first plate and the second plate, and a plurality of projections corresponding to the plurality of depressions are disposed in the other of the first plate and the second plate, the plurality of depressions configured to cooperatively engage the plurality of projections.

12. The container according to claim 11, wherein a groove is disposed in the surface of the one plate connecting the plurality of depressions to one another, the groove defined by a path traveled by the plurality of projections during relative movement of the one plate and the other plate.

13. The container according to claim 12, wherein a depth of the groove is less than a depth of each of the plurality of depressions.

* * * * *